United States Patent [19]
Duello

[11] Patent Number: 5,775,585
[45] Date of Patent: Jul. 7, 1998

[54] METHOD AND MEANS FOR EVENLY DISTRIBUTING PARTICULATE FERTILIZER

[76] Inventor: Dennis E. Duello, 5939 27th Ave., Vinton, Iowa 52349

[21] Appl. No.: 630,695

[22] Filed: Apr. 12, 1996

[51] Int. Cl.$^6$ ................................................ A01C 3/06
[52] U.S. Cl. ........................... 239/8; 239/76; 239/654
[58] Field of Search ............................. 239/654, 655, 239/8, 76; 73/861.73

[56] References Cited

U.S. PATENT DOCUMENTS

| | | |
|---|---|---|
| 4,209,131 | 6/1980 | Barash et al. |
| 4,562,968 | 1/1986 | Widmer et al. ............... 239/655 |
| 4,593,360 | 6/1986 | Cocks. |
| 4,646,941 | 3/1987 | Grosse-Scharmann et al. ...... 239/74 |
| 4,805,088 | 2/1989 | Cross et al. |
| 4,852,809 | 8/1989 | Davis et al. ................... 239/654 |
| 4,886,208 | 12/1989 | Strand ........................... 239/77 |
| 4,964,575 | 10/1990 | Takata ........................... 239/655 |
| 5,189,965 | 3/1993 | Hobbs et al. |
| 5,193,744 | 3/1993 | Goldstein. |
| 5,234,128 | 8/1993 | Hill. |
| 5,337,959 | 8/1994 | Boyd. |
| 5,560,246 | 10/1996 | Böttinger et al. ................ 73/861.73 |

*Primary Examiner*—Kevin Weldon
*Attorney, Agent, or Firm*—Zarley, McKee, Thomte, Voorhees, & Sease

[57] ABSTRACT

A bin for holding a granular material has a conveyor belt in the bottom thereof. A plurality of separate conduits are in communication with the bin with each of the conduits having a discharge end. The conveyor belt meters the granular material from the bin into the conduits. A fan is provided for supplying flowing air through the conduits to blow granular material towards the discharge ends. Each conduit has a curved portion formed therein upstream from the discharge ends. Sensors are located in each of the curved portions to measure the centrifugal force of granular material moving through the conduits towards the discharge ends. Pivotal walls are provided in each conduit to adjust the flow of granular material therethrough. A microprocessor is connected to the sensors and the actuator to sense variations in the centrifugal force measured by the sensors, and to adjust the pivotal walls in one or more of the conduits to equalize the flow of granular material through the conduits. The method comprises the use of a microprocessor to determine the quantity of flow of granular material through each of the conduits by the input of sensors in the conduits, then comparing the quantity of flow of granular material for each of the conduits to determine variations of flow among the conduits; and adjusting the flow of granular material through the conduits to cause a substantially equal quantity of granular material to flow out of the discharge ends.

4 Claims, 2 Drawing Sheets

METHOD AND MEANS FOR EVENLY DISTRIBUTING PARTICULATE FERTILIZER

BACKGROUND OF THE INVENTION

Dry granular fertilizers which are widely used in agriculture are usually mined and marketed as chemical compounds having one or more desirable fertilizer elements. These dry granular fertilizer ingredients are usually mixed in specific proportions to provide the final chemical analysis prescribed for a particular field or area.

The specific problem leading to this invention originates from the fact that the density of the various fertilizer ingredients in the mix vary from one another to the extent that when the mix is mechanically spread upon the field, the more dense granules carry farther through the air covering a wider pattern than the less dense granules. The wider the pattern attempted, the greater the problem. Though narrowing the width of the pattern tends to limit the problem, the matter becomes less tolerable as agricultural practices become more refined. Some pneumatic systems improve uniformity within the total pattern by decreasing the width of each distribution pattern, but they introduce the additional requirement of dividing and maintaining equal flow to each of the several distribution points. It is this need which is not satisfactorily addressed by currently utilized methods. There is a widely acknowledged need for improved uniformity of distribution.

Therefore, the principal object of this invention is to provide a method and means for improved, automatic, accurate, and equal distribution of divided flow in a granular distribution device.

A further object of this invention is to provide a granular fertilizer device and method to accurately and automatically divide a metered flow of blended dry granular agricultural fertilizer regardless of variations in the density of the material metered, the rate at which the material is metered, or the number of meters.

These and other objects will be apparent to those skilled in the art.

SUMMARY OF THE INVENTION

The device of this invention comprises a bin for holding a quantity of granular material, with a conveyor belt in the bottom thereof. A plurality of separate conduits are in communication with the bin with each of the conduits having a discharge end. The conveyor belt meters the granular material from the bin into the conduits. A fan is provided for supplying a source of flowing air through the conduits to blow granular material towards the discharge ends. Each conduit has a curved portion formed therein upstream from the discharge ends. Sensors are located in each of the curved portions to measure the centrifugal force of granular material moving through the conduits towards the discharge ends. Pivotal walls are provided in each conduit to adjust the flow of granular material therethrough. A microprocessor is connected to the sensors and the actuator to sense variations in the centrifugal force measured by the sensors, and to adjust the pivotal walls in one or more of the conduits to equalize the flow of granular material through the conduits.

The method of distributing a quantity of granular material of varying particulate mass comprises providing a plurality of separate distribution conduits having discharge ends; providing a curved portion in each of the conduits; forcing air through the conduits in a direction towards the discharge ends; metering granular material into the conduits upstream of the curved portions; sensing the magnitude of the impact of granular material being blown by the forced air through the curved portions of the conduits; conveying the measuring impact information occurring in each conduit to a microprocessor to determine the quantity of flow of granular material through each of the conduits; comparing the quantity of flow of granular material for each of the conduits to determine variations of flow among the conduits; and adjusting the flow of granular material through the conduits to cause a substantially equal quantity of granular material to flow out of the discharge ends.

DESCRIPTION OF THE PREFERRED EMBODIMENT

Figure 2:
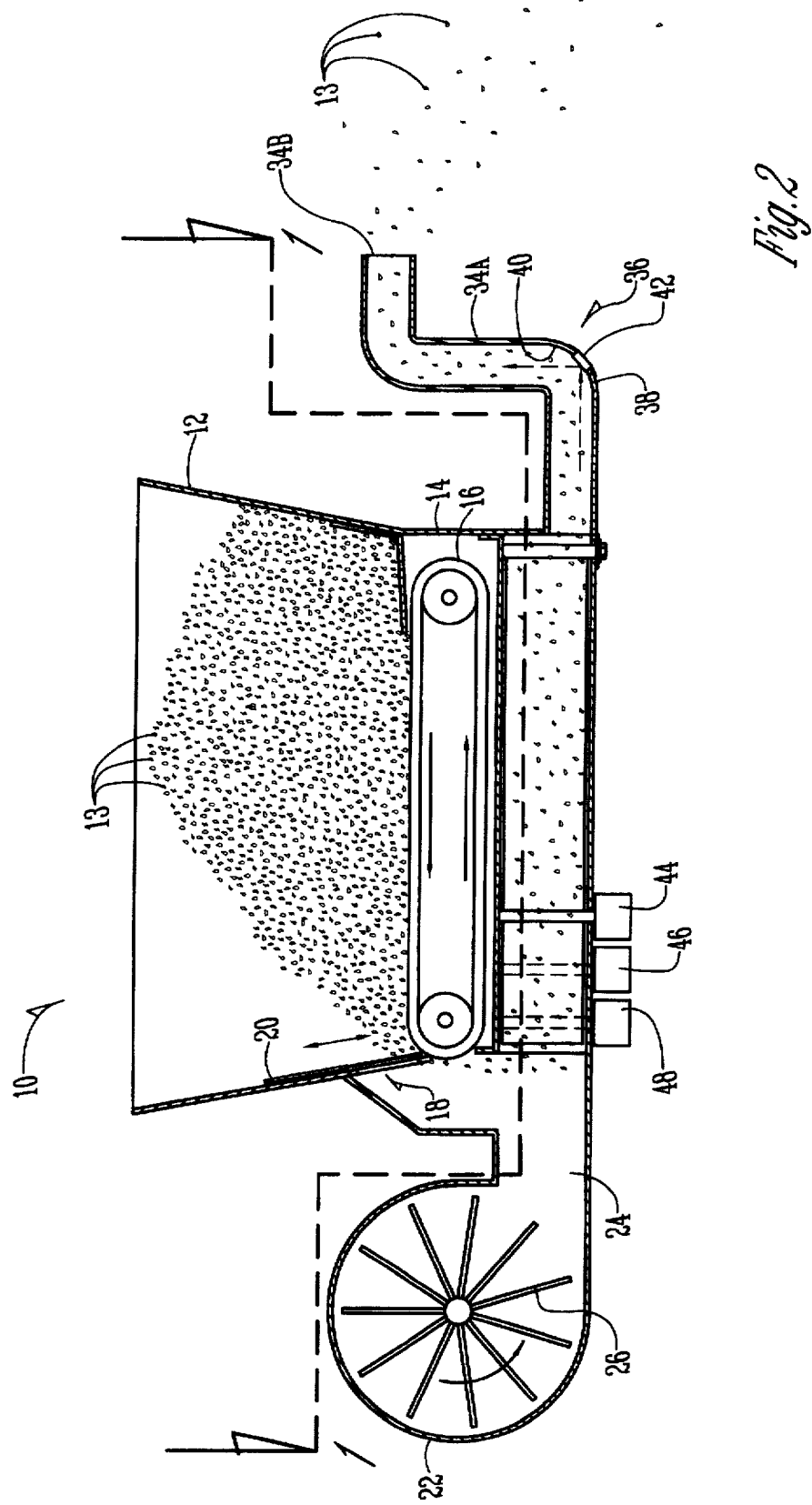
FIG. 2 is a sectional view taken on line 2—2 of FIG. 1.

With reference to FIG. 2, the numeral 10 designates the fertilizer distribution device of this invention. It is typically mounted either on a self-supporting frame (not shown) or on any suitable towed vehicle or trailer. Member 10 has a bin 12 adapted to hold a bulk quantity of granular material comprised of separate particles 13. The bin 12 has a bottom 14 in which is mounted a continuous conveyor belt powered by a suitable motor (not shown). The conveyor belt meters the material 13 through a discharge opening 18 in bin 12 which can be adjustably opened or closed by slide door 20.

A fan housing 20 has a plenum 24 and a fan rotor 26. The rotor is driven by a suitable source of rotatational power (not shown).

Figure 1:
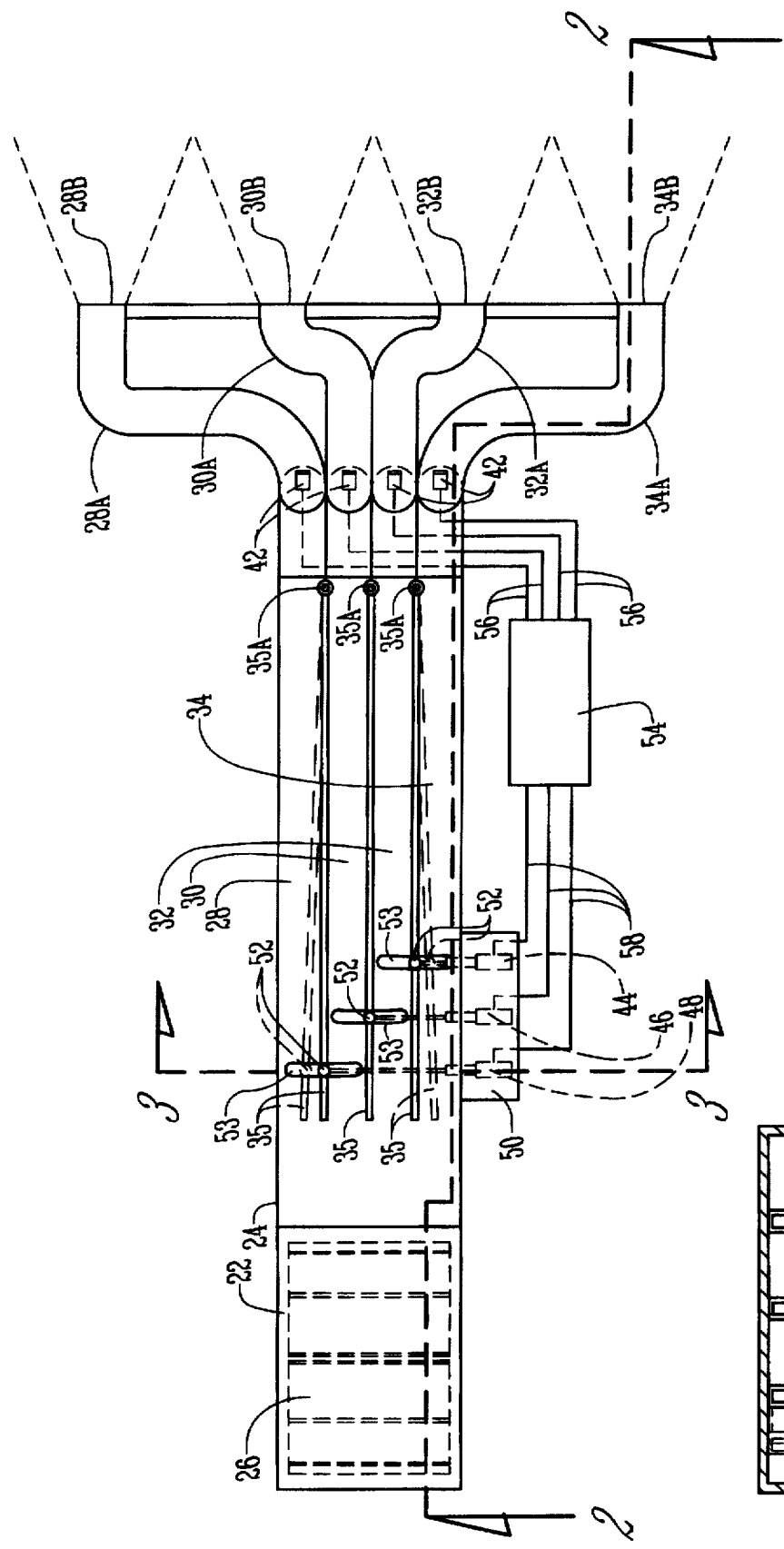
FIG. 1 is a schematic plan view of the device of this invention as taken on line 1—1 of FIG. 2.

The plenum 24 is divided into conduits 28, 30, 32 and 34 as best shown in FIG. 1. Conduit 28 has a discharge portion 28A and a discharge end 28B. Similarly, conduit 30 has a discharge portion 30A and a discharge end 30B. Conduit 32 has a discharge portion 30A and a discharge end 30B. Conduit 34 has a discharge portion 34A and a discharge end 34B. Each of the conduits are separated from each other by divider walls 35 which are pivotally mounted at their forward ends by hinges 35A. Similarly, each of the conduits has a curved portion 36 (FIG. 2) which is comprised of a curved wall 38 and a curved inner surface 40. A sensor 42 is secured to each inner curved surface 40 as best shown in FIG. 2. Sensors 42 are adapted to measure the impact from the particulate material 13 through the effects of centrifugal force as the particles are blown through the respective conduits and are forced to move through the curved portion 36 which preferably should define an arcuate curve of approximately 90 degrees.

Figure 3:
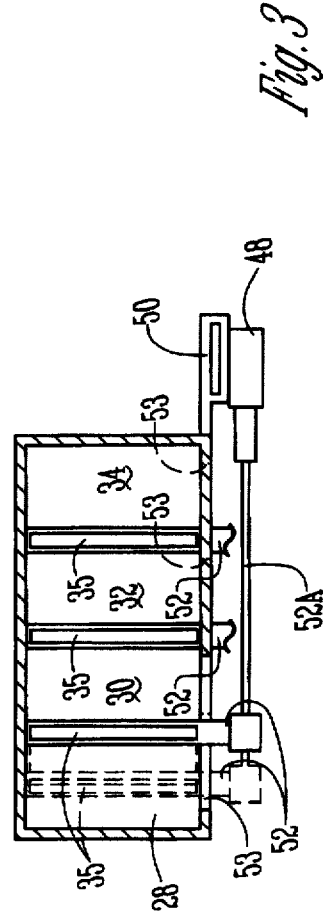
FIG. 3 is an enlarged scale sectional view taken on line 3—3 of FIG. 1.

Electrical linear actuators 44, 46 and 48 are mounted on bracket 50 (FIG. 3) and adapted to pivot divider walls 35 which are mounted on hinges 35A. Rods 52 protruding downwardly from the walls 35 through slots 53 are pivotally connected to actuator arms 52A extending from each of the actuators. (FIG. 3).

A microprocessor 54 is connected to sensors 42 by lines 56. The microprocessor 54 is also connected to actuators 44, 46 and 48 by lines 58.

The purpose of microprocessor 54 is to equalize the centrifugal force of particles in the conduits impacting on sensors 42. This is accomplished by measuring the amount of that force, and then causing one or more of actuators 44, 46 and 48 to move the divider walls 35 to a position to either increase or decrease the amount of particulate flow in a given conduit to appropriately adjust the flow of particulate material therethrough which in turn will equalize the centrifugal force imposed upon the sensors. The result of this phenomenon is that an equal amount of particulate material will be discharged from the discharge ends of each conduit.

As an example, and with reference to FIG. 1, if greater centrifugal force is reflected by sensors 42 in regard to the particulate flow in conduits 28 and 30, actuator 44 will cause the divider wall 35 between conduits 28 and 30 to pivot slightly so as to balance the flow of material in conduits 28 and 30. (See dotted lines of pivotal portions of wall 35 in FIG. 1.) The sensors 42 are conventional pressure sensitive transducers which send an electronic signal in response to the centrifugal force which is exerted upon them by the particulate material. The force is a function of particulate mass×velocity. Since velocity is constant, the sensors sense differences in mass. Centrifugal force is a function of mass, velocity and radius, the latter two which remain equal and/or constant. The microprocessor 54, as discussed above, existing between the sensors and the actuators, is programmed to keep each centrifugal force reading equal to all others.

In operation, the particulate material 13 is metered into the plenum 24 through opening 18 through the assistance of conveyor 16. The fan rotor 26 blows the particulate material 13 through the conduits 28–34. The sensors 42 measure the centrifugal force imposed thereupon by the flowing particulate material. This information is transmitted to the microprocessor 54 which is programmed to compensate for variations in the centrifugal force measured by the four sensors and to adjust the flow in the respective conduits to balance the centrifugal force imposed on the sensors. This is done by the actuators pivoting divider walls 35 as required, all as described heretofore. As a result, a uniform and equal flow of particulate material through the discharge ends of each of the conduits is insured.

It is therefore seen that this invention will achieve at least all of its stated objectives.

What is claimed is:

1. A method of distributing a quantity of granular material of varying particulate mass from a plurality of distribution points, comprising, providing a plurality of separate distribution conduits having discharge ends and adjustable side walls, providing a curved portion in each of said conduits, forcing air through said conduits in a direction towards said discharge ends, metering granular material into said conduits upstream of said curved portions and said discharge ends, sensing the magnitude of the pressure of granular material being blown by said forced air through the curved portions of said conduits, conveying the sensed pressure information occurring in each conduit to a microprocessor, comparing the pressure data caused by flow of granular material through each of said conduits to sense variations in pressure data, and hence variations of flow among said conduits, adjusting the flow of granular material through one or more of said conduits to cause a substantially equal quantity of granular material to flow out of said discharge ends, by having control means including linear actuators controlled by said microprocessor to pivot said side walls to adjust the amount of granular material being blown therethrough.

2. A distribution device for granular material, comprising, a bin for holding a quantity of granular material, a plurality of separate conduits in communication with the bin, with each conduit having a discharge end, means for metering granular material from said bin into said conduits, a source of flowing air connected to said conduits to blow granular material towards said discharge ends, a curved portion of approximately 90° formed in each conduit upstream from said discharge ends, pressure sensors within each of said curved portions substantially in the direct path of granular material passing through said conduits to sense the magnitude of the pressure of granular material moving through the curved portion of said conduits towards said discharge ends, control means in each conduit to adjust the flow of granular material therethrough, and a microprocessor connected to said sensors and said control means to sense variations in the impact measured by said sensors, and to actuate said control means in one or more of said conduits to equalize the flow of granular material through said conduits and to equalize the pressure exerted on said sensors by the flow of granular material.

3. A distribution device for granular material, comprising, a bin for holding a quantity of granular material, a plurality of separate conduits in communication with the bin, with the each conduit having a discharge end, means for metering granular material from said bin into said conduits, a source of flowing air connected to said conduits to blow granular material towards said discharge ends, a curved portion formed in each conduit upstream from said discharge ends, sensors in each of said curved portions to measure the pressure of granular material moving through said conduits towards said discharge ends, control means in each conduit to adjust the flow of granular material therethrough, a microprocessor connected to said sensors and said control means to sense variations in pressure measured by said sensors, and to actuate said control means in one or more of said conduits to equalize the flow of granular material through said conduits and to equalize the pressure exerted on said sensors, said conduits being comprised of pivotal side walls, and control means includes linear actuators controlled by said microprocessor to pivot said side walls to adjust the amount of granular material being blown therethrough.

4. A method of distributing a quantity of granular material of varying particulate mass from a plurality of distribution points, comprising, providing a plurality of separate distribution conduits having discharge ends, providing a curved portion in each of said conduits, forcing air through said conduits in a direction towards said discharge ends, metering granular material into said conduits upstream of said curved portions and said discharge ends, sensing the magnitude of the pressure of granular material being blown by said forced air through the curved portions of said conduits, conveying the measured pressure information occurring in each conduit to a microprocessor to determine the quantity of flow of granular material through each of said conduits, comparing the quantity of flow of granular material through each of said conduits to determine variations of flow among said conduits, adjusting by linear actuators controlled by said microprocessor to adjust the flow of granular material through one or more of said conduits to cause a substantial equal quantity of material to flow out of said discharge ends.

* * * * *